United States Patent

Joynson et al.

[15] 3,699,544

[45] Oct. 17, 1972

[54] THREE TRANSISTOR MEMORY CELL

[72] Inventors: Reuben E. Joynson, Scotia; Joseph L. Mundy, Schenectady, both of N.Y.

[73] Assignee: General Electric Company

[22] Filed: May 26, 1971

[21] Appl. No.: 146,969

[52] U.S. Cl...............340/173 R, 307/238, 307/279, 340/173 CA

[51] Int. Cl.........................G11c 11/24, G11c 11/40

[58] Field of Search ....340/173 R, 173 AM, 173 DR, 340/173 FF, 173 CA; 307/238, 279

[56] References Cited

UNITED STATES PATENTS

| | | | |
|---|---|---|---|
| 3,286,189 | 11/1966 | Mitchell | 340/173 |
| 3,582,909 | 6/1971 | Booher | 340/173 |

*Primary Examiner*—Terrell W. Fears
*Attorney*—Richard R. Brainard et al.

[57] ABSTRACT

A three transistor dynamic memory cell is disclosed utilizing a voltage controlled capacitor to enhance signal coupling in the cell. In addition, the refreshing operation is greatly enhanced due to the configuration of the cell; viz. refreshing is achieved without an inverting amplifier, several cells can be refreshed simultaneously, and refreshing can occur while other operations are performed by the same cell.

9 Claims, 5 Drawing Figures

Figure 1:
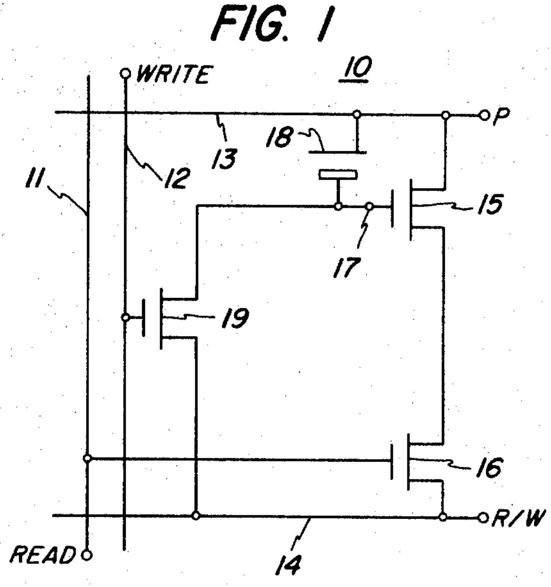

INVENTORS:
REUBEN E. JOYNSON
JOSEPH L. MUNDY by Paul F. Wille

THEIR ATTORNEY

INVENTORS:
REUBEN E. JOYNSON
JOSEPH L. MUNDY
by Paul F. Wille
THEIR ATTORNEY

THREE TRANSISTOR MEMORY CELL

This invention relates to three transistor memory cells and, in particular, to three transistor memory cells requiring greatly simplified peripheral circuitry.

In the prior art, the metal-oxide-semiconductor field effect transistor (MOSFET) memory provided a semiconductor memory alternative to the larger, more expensive bi-polar transistor memory.

A MOSFET memory may take several forms; for example, due to the high input impedance of the MOSFET, information can be stored in the form of a charge on the gate. Alternatively, a flip-flop circuit is fabricated with MOS transistors and the state of the flip-flop represents the stored information. The latter type of memory requires a relatively large number of transistors, hence, a relatively large area on a semiconductive chip.

The former type of memory, while utilizing fewer transistors per memory "cell," requires more complex peripheral circuitry. For example, signals circulating through the memory must be periodically amplified, due to voltage losses within the memory. In addition, the charge stored on the gate structure is gradually dissipated by leakages within the cell. For this reason, the information must be periodically "refreshed," i.e., the charge is read out as a voltage signal, amplified, and returned to the storage cell. Thus, peripheral amplifiers and address circuitry must be provided.

In addition, the refresh operation occupies time as a separate operation of each storage cell. Thus, the amount of time the storage cell can be put to productive use is reduced.

However, with the MOS dynamic memory, cell size can be greatly reduced thereby providing a higher number of cells per semiconductor chip as compared to the flip-flop type of MOS memory. In addition, the dynamic memory potentially has speed and power consumption advantages over the flip-flop type of MOS memory. However, this type of memory has not found widespread acceptance, due to the above enumerated difficulties and due in part to a wariness of memories requiring refreshing.

In view of the foregoing, it is therefore an object of the present invention to provide a memory cell in which voltage losses within the cell are reduced or eliminated.

Another object of the present invention is to provide a memory in which at least some of the cells are simultaneously refreshed.

A further object of the present invention is to provide a memory in which the storage cells are self-refreshed, thereby eliminating the need for external addressing and amplifying circuitry.

Another object of the present invention is to provide a memory cell in which the refresh operation is carried out simultaneously with other operations of the memory cell.

The foregoing objects are achieved by the memory cell of the present invention wherein there is provided a pair of transistors series connected between a first pair of access lines, the gate of one transistor forming a storage node and the gate of the second transistor coupled to one of a second pair of access lines. A third transistor, having its gate connected to the other of the second pair of access lines, couples signal to the storage node, having one of its source/drain electrodes coupled thereto. Coupling the storage node to one of the first pair of access lines is a voltage variable capacitor comprising a gate and drain structure. In one embodiment, the other of the source/drain electrodes of the third transistor is connected to the other of the first pair of access lines. In a second embodiment of the present invention, the other of the source/drain electrodes is coupled to the junction of the series connected first and second transistors, which further have a diode series connected therewith.

A more complete understanding of the present invention may be obtained by considering the following detailed description in conjunction with the accompanying drawings, in which:

FIG. 1 illustrates a first embodiment of the present invention having enhanced signal coupling.

Figure 2:
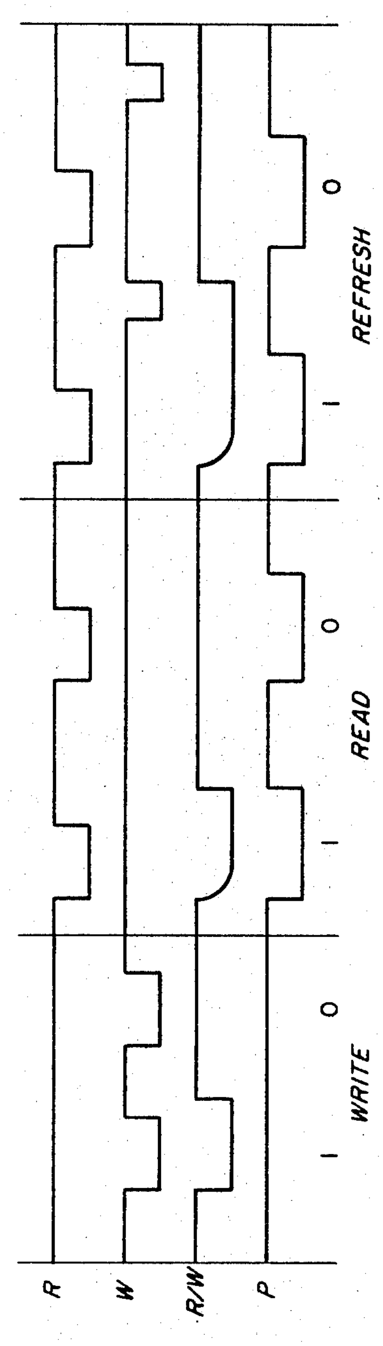

FIG. 2 contains waveforms illustrating the operation of the cell of FIG. 1.

Figure 3:
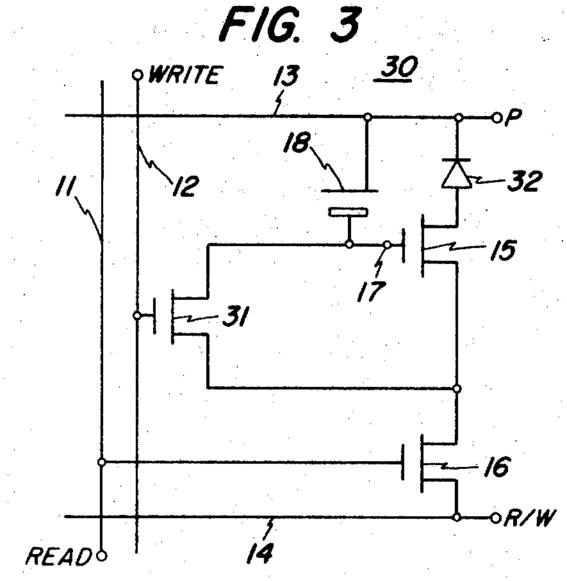

FIG. 3 illustrates a second embodiment of the present invention having self-refreshing capability.

Figure 4:
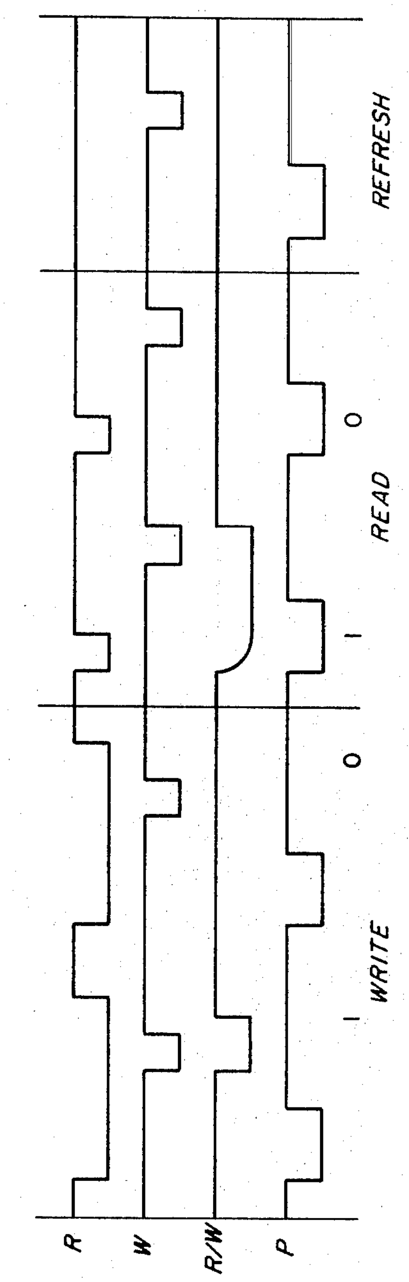

FIG. 4 contains waveforms illustrating the operation of the cell of FIG. 3.

Figure 5:
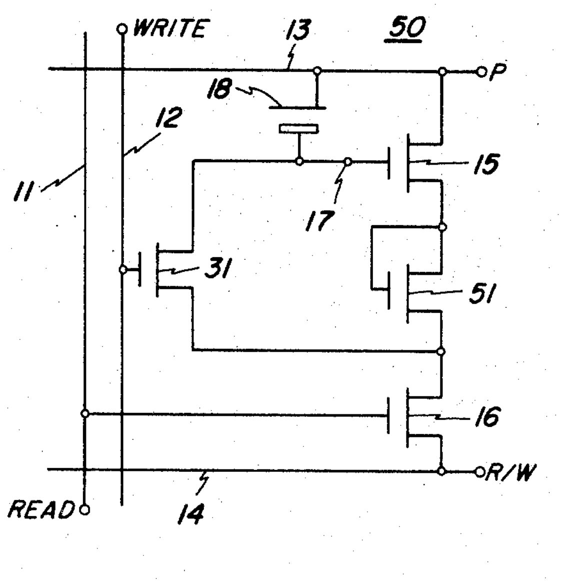

FIG. 5 illustrates an alternative form of the memory cell of FIG. 3.

Referring to FIG. 1, there is shown an improved dynamic MOS memory cell 10 in accordance with the present invention. Memory cell 10 comprises two pairs of access lines 11 and 12, 13 and 14 also designated Read, Write, P and R/W, respectively. Interconnecting lines 13 and 14 are a pair of MOS transistors 15 and 16 having their source-drain paths series connected between access lines 13 and 14. The gate of transistor 15 forms storage node 17 of memory cell 10. Interconnecting storage node 17 and line 13 is voltage variable capacitor 18. Voltage variable capacitor 18 is an MOS device comprising a drain region and an enlarged gate connected to the gate of transistor 15. Interconnecting storage node 17 and access line 14 is transistor 19 having the gate thereof connected to write line 12. Transistor 16 has the gate thereof connected to read line 11.

The overall operation of memory cell 10 may be best understood by also considering the waveforms illustrated in FIG. 2. Basically, memory cell 10 can perform three functions: WRITE, READ and REFRESH, each of which can take place with respect to a logic "1" or a logic "0."

To write in memory cell 10, write line 12 is activated or put in a "high" condition. For the purposes of describing a preferred embodiment of the present invention, the transistors utilized in memory cells are assumed to be *p*-channel transistors. Thus, the term "high" refers to a negative potential being applied to the gate of transistor 19. At the same time that write line 12 is activated, read/write line 14 is also activated or put in a "high" condition. Precharge line 13 is held at ground potential while read line 11 is not utilized. The names read, precharge, etc. given to access lines 11–14 are arbitrary, chosen merely to give some indication of the function performed with that line.

The net result of overlapping the pulses on lines 12 and 14 while line 13 is held at ground potential is to charge storage node 17 through the source/drain path of transistor 19. Assuming the presence of charge on storage node 17 indicates a logic "1," the writing operation just described writes a logic "1" on storage node 17. To write a logic 0, line 12 is activated and the read/write line is held at zero; therefore, storage node 17 is brought to zero logic voltage through transistor 19.

To read a logic "1" from cell 10, the voltage level on read/write line 14 is monitored and pulses are applied to read line 11 and precharge line 13. A pulse on read line 11 turns on transistor 16 while the storage of a logic "1" places transistor 15 in an active condition. Thus, the pulse on read line 11, activating transistor 16, completes the series path between lines 13 and 14. The pulse on precharge line 13 is coupled through this series path to line 14. Ignoring for the moment the operation of voltage variable capacitor 18, the capacitance associated with line 14 then slowly charges toward the voltage on line 13 minus the threshold loss due to either transistor 15 or 16.

The threshold losses in transistors 15 and 16 arise from the characteristics of the MOS transistors themselves. In order to turn on or activate transistor 15, for example, the voltage at storage node 17 has to exceed the lessor of the voltages on the source and drain of transistor 15, with the electrode having the lower voltage being considered the source electrode.

For the READ operation illustrated in FIG. 2, the source of transistor 15 is connected to the drain of transistor 16. As the source of transistor 15 tries to approach the voltage on line 13, a point will be reached at which the source voltage will be less than one threshold voltage lower than the gate voltage. At this point transistor 15 will become cut off thereby breaking the series path between lines 13 and 14 and causing the charging of the capacitance associated with line 14 to come to an end.

However, in accordance with the present invention, voltage variable capacitor 18 provides a mechanism whereby the voltage at storage node 17 is increased, thereby enabling the voltage of the source of transistor 15 to become much greater.

Voltage variable capacitor 18 is described in detail in application Ser. No. 146,966, filed concurrently herewith, and assigned to the same assignee of the present invention. Briefly, voltage variable capacitor 18 comprises a drain electrode and an enlarged gate electrode connected to the gate of transistor 15. When in the inactive state, the capacitance exhibited by voltage variable capacitor 18 comprises the overlap capacitance between its drain and gate electrodes. However, when a logic "1" is stored on storage node 17, an inversion layer is formed which extends underneath the gate electrode and is electrically connected to the drain of voltage variable capacitor 18. The inversion layer in the semiconductor substrate of voltage variable capacitor 18 and the gate electrode thereover now form a relatively large capacitance interconnecting line 13 and storage node 17. Thus, a pulse on line 13 is closely coupled by voltage variable capacitor 18, when in the active state, to storage node 17, boosting the voltage on storage node 17 and enabling the source voltage of transistor 15 to rise much higher than it normally could. This serves two important purposes: First, it increases the voltage to which read/write line 14 can rise and, second, due to the higher voltage obtainable, line 14 charges more rapidly than it would if voltage variable capacitor 18 were not present.

Suitable peripheral circuitry, monitoring the voltage on read/write line 14, will then detect the presence of a logic one due to the increase in the voltage of line 14 and discharge line 14 at the end of the READ operation.

Reading a logic zero proceeds in a similar fashion in that pulses are applied to read line 11 and precharge line 13. However, with no voltage stored at storage node 17, transistor 15 is in an off condition and voltage variable capacitor 18 is in an inactive condition, exhibiting a minimum of capacitance. Thus, although the pulse on line 11 places transistor 16 in an active state, the pulse on line 13 is blocked by transistor 15 from reaching read/write line 14. The minimum capacitance exhibited by voltage variable capacitor 18 does not provide sufficient coupling to turn on transistor 15 so that a spurious reading of a logic "1" cannot take place.

By virtue of the variable capacitance exhibited by voltage variable capacitor 18, the difference in reading out a logic "1" and a logic "0" is greatly increased due to the voltage enhancement produced by the voltage variable capacitor when in the active state.

As previously noted, the charge stored on storage node 17 may be dissipated with time due to the leakage paths associated with the storage node. For example, transistor 19 coupled to storage node 17 provides a *p-n* junction to ground whereby the charge on storage node 17 may gradually be dissipated. Thus, it is necessary to periodically refresh the information stored in each memory cell. By the present invention, each memory cell, with suitable signals applied to the access leads thereof, is capable of refreshing itself without peripheral amplifiers and addressing circuitry and carries out the self-refreshing operation in a manner distinct from the writing operation so that it is not possible to accidentally alter the information of the cell during the REFRESH operation.

The REFRESH operation may be summarized as a reading operation with the read/write line, initially discharged, then allowed to "float" so that it can be charged according to the information stored in the cell. The information is then read back into the storage node from the read/write line.

Specifically, for refreshing a logic "1," a pulse is applied to read line 11 and precharge line 13. These pulses combine to enable the capacitance associated with line 14 to charge in a manner described previously for reading a logic "1." For the REFRESH operation, however, the voltage on line 14 is not monitored by external circuitry but is merely allowed to float. After the termination of the pulses on read line 11 and precharge line 13, a pulse is applied to write line 12 thereby turning on transistor 19. Transistor 19 provides a resistive path between read/write line 14 and storage node 17 so as to recharge storage node 17.

If a logic zero were stored, then read/write line 14 would not be charged and no charge would be available for coupling to storage node 17. In this manner, a memory comprising a matrix of rows and columns of memory cells such as memory cell 10 can be refreshed column by column without the need for external processing equipment. In addition, the voltage obtainable from memory cell 10 during the READ operation is higher than those obtainable with MOS dynamic memory cell of the prior art with the same external voltages.

While a pulse on write line 12 could be applied after each READ operation, the REFRESH operation of memory cell 10 is more or less a separate operation from the WRITE and READ operations. In the embodiment of FIG. 3, the REFRESH operation occurs simultaneously with the WRITE and READ operation, thereby not consuming any of the productive time of the memory cell, while retaining all of the features of the memory cell of FIG. 1.

Referring to FIG. 3, there is shown memory cell 30 comprising transistors 15 and 16 series connected between precharge line 13 and read/write line 14. In series with the source-drain paths of transistors 15 and 16 is diode 32. Voltage variable capacitor 18 is connected between precharge line 13 and storage node 17. Transistor 31 has its source-drain path connected between storage node 17 and the junction of transistors 15 and 16. The gate of transistor 31 is connected to write line 12. In general, memory cell 30 is similar to memory cell 10 except for the connection of the source electrode of transistor 31 and the addition of diode 32.

The overall operation of memory cell 30, however, is substantially different from the operation of memory cell 10. The WRITE, READ and REFRESH operations may best be understood by also considering the wave forms illustrated in FIG. 4. The WRITE operation is accomplished by applying pulses to lines 11 and 12 which activate transistors 16 and 31 respectively. When transistors 16 and 31 have been activated, there is provided a series resistance path from storage node 17 to read/write line 14. Applying a pulse to read/write line 14 will cause a logic "1" to be stored on storage node 17 and the maintaining of read/write line 14 at ground potential will cause a logic "0" to be stored at storage node 17. The pulses on line P in the WRITE section of FIG. 4 have to do with the REFRESH operation that is also occuring during the WRITE cycle. The simultaneous REFRESH operation will be more fully described below.

The READ operation is accomplished by applying pulses to lines 11 and 13. A pulse on read line 11 activates transistor 16 thereby connecting transistor 15 with read/write line 14. If a logic 1 is stored on storage node 17, then transistor 15 and voltage variable capacitor 18 are in the active state as discussed above in connection with FIG. 1. The pulse on line 13 therefore is coupled to the gate of transistor 15 by way of voltage variable capacitor 18 and serves to increase the voltage on the source of transistor 15, which is connected to transistor 16. Diode 32 is forward biased during the time a pulse is on precharged line 13. Thus, during the reading of a logic "1," transistors 15 and 16 are turned on and couple read/write line 14 to precharge line 13. Read/write line 14, which is floating but monitored, is allowed to charge toward the potential of precharge line 13. The voltage increase on read/write line 14 is then sensed by a suitable sense amplifier coupled to line 14 as an indication of the storage of logic " 1."

If a logic "0" had been stored on storage node 17, then transistor 15 and voltage variable capacitor 18 would be in an off condition, preventing the coupling of the voltage on precharge line 13 to read/write line 14. Thus, no output signal would be sensed by the sense amplifier connected to line 14. The pulses illustrated in FIG. 4 on write line 12 are concerned with the simultaneous refresh operation and do not directly play a part in the READ operation.

As illustrated in FIG. 4, the REFRESH operation is accomplished by a pulse on precharge line 13 followed by a non-overlapping pulse on write line 12. As can be seen by inspection of FIG. 4, this combination of pulses can occur in both the WRITE and READ operations.

Specifically, during the REFRESH operation, a pulse is first applied to precharge line 13. If a logic "1" is stored on storage node 17, transistor 15 and voltage variable capacitor 18 are in an active condition and couple charge from line 13 to the junction of transistors 15, 16 and 31 where the charge is stored on the capacitances associated with the electrodes connected at the junction. After the pulse on line 13 has been terminated, a pulse is applied to write line 12 which activates transistor 31. Transistor 31 then transfers the charge stored on the junction of the three transistors back to storage node 17.

The charge transferred to storage node 17 during the refresh operation equals or exceeds the charge lost from storage node 17 since the last refresh operation. Then the voltage of storage node 17 is increased by the refresh operation. This last effect is obtained by having the capacitances associated with the electrodes of the three transistors equal or exceed the capacitance of the storage node.

It will be recalled that voltage variable capacitor 18 serves to boost the voltage on storage node 17 when a pulse is applied to precharge line 13. While the voltage pulse thus applied does not directly increase the amount of charge at storage node 17, it raises the voltage to which the source of transistor 15 can be raised, which in turn increases the amount of charge that can be stored by the capacitances associated with the joined electrodes of transistors 15, 16 and 31. Upon activation, transistor 31 provides a resistive path coupling this charge to storage node 17. It is important to note that during the REFRESH operation, read line 11 and read/write line 14 are not disturbed. Rather, the entire operation takes place within cell 30. Also, by using two, time displaced pulses in this manner to obtain the REFRESH operation, the REFRESH operation can be carried out during the WRITE and READ operations.

In FIG. 5, there is shown an alternative embodiment of the present invention. Transistor 15 is is directly connected to precharge line 13 and has a diode, formed by transistor 51 having its gate and drain electrodes connected together, connected to the source thereof. Otherwise, the circuit for memory cell 50 is the same as the circuit for memory cell 30. The change in location of the diode in the series connected source-drain paths between the precharge line 30 and read/write line 14 is made in accordance with the amount of voltage enhancement obtainable by voltage variable capacitor 18. For example, in FIG. 3, the maximum voltage at the drain of transistor 15 is equal to the voltage on line 13 minus the voltage drop across diode 32. In FIG. 5, however, the voltage on the drain of transistor 15 is the full amount of voltage applied to line 13. In memory cell 50, where a large voltage enhancement is obtainable from voltage variable capacitor 18, diode 51 is moved to the source of transistor 15 where the voltage drop encountered across diode 51 can be overcome by the enhancement due to voltage variable capacitor 18.

Memory cell 50 operates in the same manner as memory cell 30, that is, as illustrated by the waveforms in FIG. 4.

In both memory cells 30 and 50, diodes 32 and 51 respectively prevent the leakage of charge to precharge line 30 during those times when transistor 31 is in the active state. For example, during the REFRESH operation, when a pulse is applied to write line 12, transistor 31 is activated. Assuming that a logic "1" is stored on storage node 17, then the charge on the storage node can leak to precharge line 13, which is at ground potential. The path taken by the charge would include the source-drain path of transistor 31 and the source-drain path of transistor 15. By inserting diode 32 however, this leakage path to ground potential is blocked due to the fact that during this time diode 32 is back-biased. In similar fashion, transistor 51 in memory cell 50 blocks the leakage of charge through transistor 15 to precharge line 13.

There is thus provided by the present invention a three transistor dynamic memory cell capable of producing higher voltages, operating at higher speeds and refreshing its own information without the need for peripheral refreshing circuitry. In addition, in another embodiment of the present invention, a memory cell is shown and described in which the REFRESH operation does not require time devoted exclusively to refreshing. The REFRESH operation can be carried out during reading and writing and, further, is done entirely within the cell, requiring only signals on two of the four access lines. The remaining access lines are unaffected by the REFRESH operation and are isolated from the REFRESH operation within the cell by transistors of the cell. Thus, an entire array can be simultaneously refreshed without recourse to cell by cell or column by column refresh.

Having thus described the invention it will be apparent to those of skill in the art that many modifications can be made within the spirit and scope of the present invention. For example, although the preferred embodiment has been described in conjunction with *p*-channel MOS transistors, the present invention applies to memory cells utilizing *n*-channel transistors as well.

What we claim as new and desire to secure by Letters Patent of the United States is:

1. An improved three transistor memory cell comprising:

first and second pairs of access lines;

first and second field effect transistors having their source-drain paths series connected across said first pair of access lines; the gate of said first transistor forming a storage node for storing information in the form of electric charge; the gate of said second transistor coupled to one of said second pair of access lines and controlled by signals thereon;

a third field effect transistor, having its gate coupled to the other of said second pair of access lines and controlled by signals thereon, for coupling signals to said storage node; and a voltage variable capacitor, comprising a gate electrode and a drain electrode, for selectively coupling signals from one of said first pairs of access lines to said storage node.

2. An improved memory cell as set forth in claim 1 wherein the drain electrode of said voltage variable capacitor comprises the drain of said first transistor.

3. An improved memory cell as set forth in claim 2 wherein the source-drain path of said third transistor is coupled between said storage node and the other of said first pair of access lines.

4. An improved memory cell as set forth in claim 1, wherein the drain electrode of said voltage variable capacitor comprises a separate drain electrode connected to one of said first pair of access lines.

5. An improved memory cell as set forth in claim 4 wherein the source-drain path of said third transistor is connected between said storage node and the junction of said first and second transistors.

6. An improved memory cell as set forth in claim 5 and further comprising a diode connecting said series connected first and second transistors to said one of said first pair of access lines.

7. An improved memory cell as set forth in claim 6 wherein said diode comprises a transistor having its gate and drain electrodes connected together.

8. An improved memory cell a set forth in claim 5 and further comprising a diode series connected between the source-drain paths of said first and second transistors, and wherein the source-drain path of said third transistor is connected between said storage node and the junction of said second transistor and said diode.

9. An improved memory cell as set forth in claim 8 wherein said diode comprises a transistor having its gate and drain electrodes connected together.

* * * * *